Figure 1:
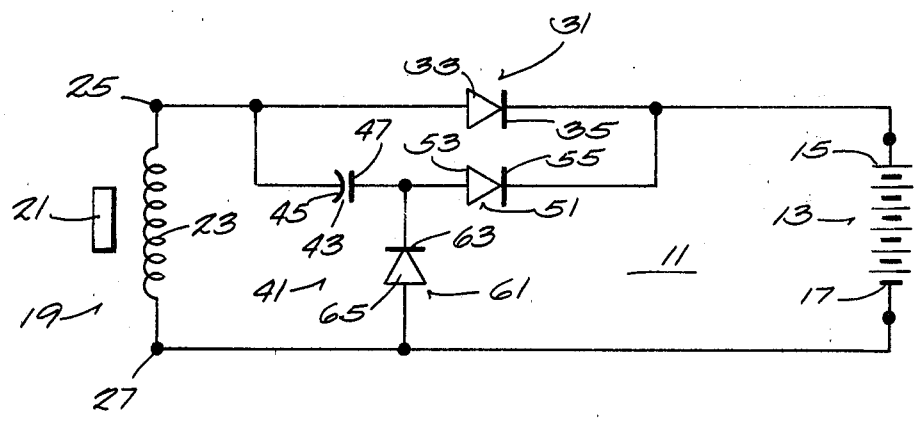

United States Patent [19]

St. Ledger

[11] 4,387,333

[45] Jun. 7, 1983

[54] CIRCUIT FOR CHARGING BATTERY AT HIGHER POTENTIAL

[75] Inventor: Joseph B. St. Ledger, Knoxville, Ill.

[73] Assignee: Outboard Marine Corporation, Waukegan, Ill.

[21] Appl. No.: 211,641

[22] Filed: Dec. 1, 1980

[51] Int. Cl.³ .............................................. H02J 7/14
[52] U.S. Cl. ...................................... 320/21; 320/51; 320/57; 322/89; 363/59; 363/61
[58] Field of Search ...................... 322/89, 90, 60, 95, 322/96; 363/59–61; 320/21, 51, 57, 59, 7

[56] References Cited

U.S. PATENT DOCUMENTS

| | | | |
|---|---|---|---|
| 3,121,835 | 2/1964 | Diebold | 363/59 |
| 3,354,379 | 11/1967 | Swain et al. | 363/61 |
| 3,525,031 | 8/1970 | King | 363/61 |
| 4,100,474 | 7/1978 | Pfeffer et al. | 322/90 X |

Primary Examiner—R. J. Hickey
Attorney, Agent, or Firm—Michael, Best & Friedrich

[57] ABSTRACT

Disclosed herein is a circuit for charging a battery having opposed terminals, which circuit includes a relatively rotatable magnet and charge coil for generating charging potentials of alternating first and second polarities, the charge coil having first and second terminals, a diode having an anode connected to the first terminal of the charge coil and a cathode adapted for connection to one of the battery terminals, whereby to afford application to the battery for charging purposes of the potential of the first polarity, and a sub circuit connected to the first and second terminals of the charge coil and to the opposed terminals of the battery for storing the energy of the second polarity potential and for applying the stored energy to the battery with the application to the battery of the potential of the first polarity.

6 Claims, 1 Drawing Figure

4,387,333

CIRCUIT FOR CHARGING BATTERY AT HIGHER POTENTIAL

BACKGROUND OF THE INVENTION

The invention relates generally to battery charging circuits. The invention also relates to battery charging by means operable to alternately generate successive potentials of opposite polarity, i.e., means operable to generate a first half wave of a first potential and to generate a second half wave of a second or opposite potential.

In the past, the potential of a first polarity was more or less directly applied to the battery for charging thereof, while the potential of the other or second polarity was either wasted or rectified for application to the battery for charging thereof independently of the application to the battery of the potential of the first polarity. The magnitude of each polarity potential had to exceed the bucking voltage of the battery before current or energy flow and charging of the battery could occur.

SUMMARY OF THE INVENTION

The invention is directed to the concept of storing the energy of the second polarity potential and applying such energy to charge the battery when the potential of the first polarity potential exceeds the battery bucking voltage. Thus, the battery is more efficiently charged than if the potentials of opposite polarity were separately or independently applied to the battery for charging thereof.

More specifically, the invention provides a circuit for charging a battery having opposed terminals, which circuit includes means for generating charging potentials of alternating first and second polarities including a charge coil having first and second terminals, a diode having an anode connected to the first terminal of the charge coil and a cathode adapted for connection to one of the battery terminals, whereby to afford application to the battery for charging purposes of the potential of the first polarity generated by the means for generating charging potentials of alternating polarities, and means connected to the first and second terminals of the charge coil and to the opposed terminals of the battery for storing the energy of the second polarity potential generated by the means for generating charging potentials of alternating polarities and for applying the stored energy to the battery with the application to the battery of the potential of the first polarity.

In one embodiment in accordance with the invention, the means for storing the energy of the second polarity potential and for applying the stored energy to the battery comprises a capacitor having a first plate connected to the first terminal of the charge coil in parallel with the anode of said first mentioned diode, which capacitor also includes a second plate, a second diode including an anode connected to the second plate of the capacitor, which second diode also includes a cathode, a third diode having a cathode connected between the second capacitor plate and the anode of the second diode and having an anode connected to the second charge coil terminal, the cathodes of the first and second diodes being adapted for connection to one of the opposed terminals of the battery, and the anode of the third diode and the second charge coil terminal being adapted for connection to the other one of the opposed terminals of the battery.

In one embodiment of the invention, the circuit further includes a battery having a first terminal connected to the cathodes of the first and second diodes and also having a second terminal connected to the anode of the third diode and to the second terminal of the charge coil.

Other features and advantages of the embodiments of the invention will become known by reference to the following general description, claims, and appended drawings.

IN THE DRAWINGS

FIG. 1 is a schematic view of a battery charging circuit incorporating various of the features of the invention.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in FIG. 1 is a circuit 11 for charging of a battery 13 having opposite terminals 15 and 17. The circuit 11 includes means 19 for generating a charging potential of alternating first and second polarities including a magnet 21, a charge coil 23 which has relatively little resistance and first and second terminals 25 and 27, and means (not shown) for providing relative rotation between the magnet 21 and the charge coil 23. Normally, the magnet 21 is carried by a flywheel or other rotatable component and the charge coil 23 is stationarily mounted adjacent to the path of the magnet 21. Consequently, the magnet 21 and charge coil 23 cooperate to generate an alternating current having a first half wave of the first polarity and a second half wave of the second or opposite polarity.

Also included in the circuit 11 is a first diode 31 which includes an anode 33 connected to the first terminal 25 of the charge coil 23 and a cathode 35 connected to the terminal 15 of the battery, whereby potential of one polarity, i.e., the first half wave, can be applied to the battery 13 for charging thereof.

Also included in the circuit is means 41 for storing the energy of the opposite polarity potential, i.e., of the second half wave, and for applying the stored energy to the battery for charging thereof simultaneously with charging application to the battery of the potential of the polarity generated by the first half wave. While various other arrangements could be employed, in the disclosed construction, the means 41 for storing the energy of the second half wave potential and for applying the stored energy to the battery 13 simultaneously with application thereto of the first half wave potential comprises a capacitor 43 having a first plate 45 connected to the first terminal 25 of the charge coil 23 in parallel with the connection of the anode 33 of the first diode 31. In addition, the capacitor 43 also includes a second plate 47.

Still further, the means 41 for storing the energy of the second half wave potential and for applying the energy of the second half wave potential to the battery 13 includes a second diode 51 having an anode 53 connected to the second plate 47 of the capacitor 43 and a cathode 55 connected to the terminal 15 of the battery 13 in parallel with connection of the cathode 35 of the first diode 31.

In addition, the means 41 for storing the energy of the second half wave potential and for applying the stored energy to the battery 13 further includes a third diode 61 having a cathode 63 connected between the second plate 47 of the capacitor 43 and the anode 53 of the second diode 51. In addition, the third diode 61 includes an anode 65 connected to the second terminal 27 of the charge coil 23 and to the other terminal 17 of the battery 13.

In operation, the energy of the second half wave potential is applied through the third diode 61 to the second plate 47 of the capacitor 43 for storage until the next generation of the first half wave potential i.e., the first polarity. Upon such generation, when the potential of the first half wave exceeds the bucking voltage of the battery, such first half wave potential is applied directly through the first diode 31 to the terminal 15 of the battery 13 and the stored energy of the second half wave potential is simultaneously discharged through the second diode 51 and applied to the battery 13 for charging thereof. Thus, the total energy applied for battery charging application is greater because all of the energy of the second half wave (less circuit losses) is available for battery charging and not merely that energy of the second half wave under the potential curve above the battery bucking voltage.

Various of the features of the invention are set forth in the following claims.

What is claimed is:

1. A circuit for charging a battery having opposed terminals, said circuit including a source of alternating potentials of first and second polarities, said source including first and second terminals, a diode having an anode connected to said first terminal of said source and a cathode adapted for connection to one of the battery terminals, whereby to afford application to the battery for charging purposes of the potential of the first polarity, and means connected to said first and second terminals of said source and to the opposed terminals of the battery for storing the energy of the second polarity potential without completing a circuit through the battery and for applying the stored energy to the battery with the application to the battery of the potential of the first polarity, said means for storing energy and for applying the stored energy including a capacitor having a plate connected to said first terminal in parallel with the connection of said anode to said first terminal for application to said plate of alternating potentials.

2. A circuit for charging a battery having opposed terminals, said circuit including means for generating charging potentials of alternating first and second polarities including a charge coil having first and second terminals, a diode having an anode connected to said first terminal of said charge coil and a cathode adapted for connection to one of the battery terminals, whereby to afford application to the battery for charging purposes of the potential of the first polarity generated by said means for generating charging potentials of alternating polarities, a capacitor having a first plate connected to said first terminal of said charge coil in parallel with said anode of said first mentioned diode, said capacitor also including a second plate, a second diode including an anode connected to said second plate of said capacitor, said second diode also including a cathode, a third diode having a cathode connected between said second capacitor plate and said anode of said second diode and having an anode connected to said second charge coil terminal, said cathode of said second diode being adapted for connection to the one battery terminal, and said anode of said third diode and said second charge coil terminal being adapted for connection to the other one of the battery terminals.

3. A circuit in accordance with claim 2 and further including a battery having a first terminal connected to said cathodes of said first and second diodes and also having a second terminal connected to said anode of said third diode and to said second terminal of said charge coil.

4. A circuit for charging a battery having opposed terminals, said circuit comprising a charge coil having first and second terminals, a first diode including an anode connected to said first terminal of said charge coil, said first diode also including a cathode, a capacitor including a first plate connected to said first terminal of said charge coil in parallel with said first diode, and also including a second plate, a second diode including an anode connected to said second plate and a cathode, a third diode having a cathode connected between said second capacitor plate and said second diode anode and having an anode connected to said second charge coil terminal, said cathodes of said first and second diodes being adapted for connection to one of the opposed terminals of the battery and said second charge coil terminal and said third diode anode being adapted for connection to the other one of the opposed terminals of the battery.

5. A battery charging circuit comprising a battery having opposed first and second terminals, a charge coil having first and second terminals, a first diode including an anode connected to said first terminal of said charge coil, and a cathode connected to said first battery terminal, a capacitor including a first plate connected to said first terminal of said charge coil in parallel with said first diode, and also including a second plate, a second diode including an anode connected to said second plate and a cathode connected to said first battery terminal, a third diode having a cathode connected between said second capacitor plate and said second diode anode and having an anode connected to said second charge coil terminal and to said second terminal of said battery.

6. A circuit for charging a battery having opposed terminals, said circuit including a source of alternating potentials of first and second polarities, said source including first and second terminals, a diode having an anode connected to said first terminal of said source and a cathode adapted for connection to one of the battery terminals, whereby to afford application to the battery for charging purposes of the potential of the first polarity, a capacitor having a first plate connected to said first terminal of said source in parallel with said anode of said first diode, said capacitor also including a second plate, a second diode including an anode connected to said second plate of said capacitor, said second diode also including a cathode, a third diode having a cathode connected between said second capacitor plate and said anode of said second diode and having an anode connected to said second terminal of said source, said cathode of said second diode being adapted for connection to the one battery terminal, and said anode of said third diode and said second terminal of said source being adapted for connection to the other one of the battery terminals.

* * * * *